(12) United States Patent
Spangler

(10) Patent No.: US 9,938,842 B2
(45) Date of Patent: Apr. 10, 2018

(54) LEAKAGE AIR SYSTEMS FOR TURBOMACHINES

(71) Applicant: UNITED TECHNOLOGIES CORPORATION, Farmington, CT (US)

(72) Inventor: Brandon W. Spangler, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 438 days.

(21) Appl. No.: 14/601,033

(22) Filed: Jan. 20, 2015

(65) Prior Publication Data

US 2016/0208631 A1 Jul. 21, 2016

(51) Int. Cl.
F01D 5/18 (2006.01)
F01D 9/06 (2006.01)
(Continued)

(52) U.S. Cl.
CPC ............ F01D 9/065 (2013.01); F01D 9/02 (2013.01); F01D 25/12 (2013.01); Y02T 50/675 (2013.01)

(58) Field of Classification Search
CPC .................... F01D 9/06; F01D 9/065
See application file for complete search history.

(56) References Cited

U.S. PATENT DOCUMENTS 2,961,150 A * 11/1960 Pirtle ............. F01D 9/065
415/177

8,328,518 B2 * 12/2012 Liang ............. F01D 5/187
415/115

(Continued)

FOREIGN PATENT DOCUMENTS

| DE | 19810339 | 9/1998 |
|---|---|---|
| EP | 0768448 | 4/1997 |
| EP | 0864728 | 9/1998 |

OTHER PUBLICATIONS

European Search Report, European Application No./Patent No. 15195714.9-1610, dated Jul. 15, 2016, European Patent Office; European Search Report 7 pages.

Primary Examiner — Logan Kraft
Assistant Examiner — Jason Fountain
(74) Attorney, Agent, or Firm — Cantor Colburn LLP

(57) ABSTRACT

A cooling system for a turbomachine includes a vane having an outer diameter platform at one end and an inner diameter platform at another end opposite the outer diameter platform. The outer diameter platform includes outer diameter attachment structure operative to mount the vane to an outer diameter stationary structure. The inner diameter platform is operative to be disposed on an inner diameter stationary structure. The cooling system also includes an airfoil disposed between the outer diameter platform and the inner diameter platform and defining a first cross-passage. The first cross-passage defines a first outer diameter opening in the outer diameter platform. The first cross-passage defines a first inner diameter opening in the inner diameter platform such that a first leakage flow can pass through the vane from the inner diameter platform, through the airfoil, to the outer diameter platform, and into an outer diameter leakage path of the vane.

18 Claims, 3 Drawing Sheets

(51) Int. Cl.
  *F01D 9/02*   (2006.01)
  *F01D 25/12*  (2006.01)

(56) References Cited

U.S. PATENT DOCUMENTS

| | | | |
|---|---|---|---|
| 8,500,392 B2 * | 8/2013 | Durocher | F01D 9/06 |
| | | | 415/116 |
| 9,188,016 B2 * | 11/2015 | Carrier | F01D 9/02 |
| 2011/0081237 A1 | 4/2011 | Durocher et al. | |
| 2014/0020359 A1 * | 1/2014 | Mimura | F01D 9/065 |
| | | | 60/39.182 |

* cited by examiner

LEAKAGE AIR SYSTEMS FOR TURBOMACHINES

STATEMENT OF GOVERNMENT RIGHTS

This invention was made with government support under Contract No. FA8650-09-D-2923-0021 awarded by the Air Force. The government has certain rights in the invention.

BACKGROUND

1. Field

The present disclosure relates to turbomachine cooling systems, more specifically to leakage path cooling systems.

2. Description of Related Art

Traditional turbomachines pressurize "cold" air into leakage paths associated with blade and vane portions of turbomachines (e.g., in a turbine section) to prevent hot gas path gases from leaking into the surrounding housing components that are not designed to sustain the temperatures of the gas path gases. In certain configurations, non-gas path components include temperature limits ranging from about 1200 degrees F. (about 649 degrees C.) to about 1450 degrees F. (about 788 degrees C.). Leakage air exits through leakage paths inward and joins the gas path, thereby blocking hot gases from traveling out through the leakage paths.

Such conventional methods and systems have generally been considered satisfactory for their intended purpose. However, there is still a need in the art for improved thermodynamic efficiency and enhanced component cooling in turbomachines. The present disclosure provides a solution for this need.

SUMMARY

A cooling system for a turbomachine includes a vane having an outer diameter platform at one end and an inner diameter platform at another end opposite the outer diameter platform. The outer diameter platform includes outer diameter attachment structure operative to mount the vane to an outer diameter stationary structure. The inner diameter platform is operative to be disposed on an inner diameter component.

An outer diameter cavity can be defined by the outer diameter platform and an outer diameter component. An inner diameter cavity can be defined by the inner diameter platform and the inner diameter component.

The cooling system also includes an airfoil disposed between the outer diameter platform and the inner diameter platform and defining a first cross-passage. The first cross-passage defines a first outer diameter opening in the outer diameter platform. The first cross-passage defines a first inner diameter opening in the inner diameter platform such that a first leakage flow can pass through the vane from the inner diameter platform, through the airfoil, to the outer diameter platform, and into an outer diameter leakage path of the vane.

The outer diameter component can be a cover plate that is disposed on the outer diameter platform. The inner diameter component can be a cover plate that is disposed on the inner diameter platform. In certain embodiments, the inner diameter component can be an inner diameter stationary structure that is disposed on the inner diameter platform.

The airfoil can include additional cooling passages in fluid communication with vane outlets for allowing flow to exit from the airfoil directly into a gas path. The outer diameter leakage path can be between a pair of outer diameter feather seals of the outer diameter platform. The outer diameter opening can be disposed between attachment structure and in fluid communication with the outer diameter leakage path.

The airfoil of the vane can also include a second cross-passage, a second outer diameter opening, and a second inner diameter opening such that a second leakage flow can pass through the vane from the outer diameter platform to the inner diameter cavity and into in an inner diameter leakage path of the vane. The second outer diameter opening can be upstream of the outer diameter attachment structure relative to a gas path. The second outer diameter opening is axially in between the outer diameter attachment structure.

In certain embodiments, a turbine cooling air (TCA) pipe can be in fluid communication with the second outer diameter opening. A transfer tube can be operatively coupled to the inner air seal cooling inlet and the first inner diameter opening, such that the second inner diameter opening can be isolated from the first inner diameter opening.

The first cross-passage and the second cross-passage can be dimensioned and/or positioned to increase a temperature of leakage flow up to, but not including, a material failure temperature of a component associated with the vane.

A method for cooling a component of a turbomachine can include passing a first leakage flow from an inner diameter to an outer diameter of a vane and leaking the first leakage flow through an outer diameter leakage path into a gas path after passing the first leakage flow through an airfoil of the vane. The method can further include allowing the first leakage flow to heat up to, but not including, a material failure temperature of a component associated with the vane. The method can further include passing a second leakage flow through the airfoil of the vane in the opposite direction of the first leakage flow and leaking the flow. The method can further include isolating the first leakage flow from the second leakage flow.

A method for cooling a component of a turbomachine can include passing a first leakage flow from an inner diameter to an outer diameter of a vane through an airfoil of the vane, passing a second leakage flow from an outer diameter to an inner diameter of a vane through an airfoil of the vane, leaking the first leakage flow through an outer diameter leakage path into a gas path after passing the first leakage flow through the airfoil of the vane, and leaking the second leakage flow through an inner diameter leakage path into the gas path after passing the second leakage flow through the airfoil of the vane. The method can further include allowing the first leakage flow and/or second leakage flow to heat up to, but not including, a material failure temperature of a component associated with the vane.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
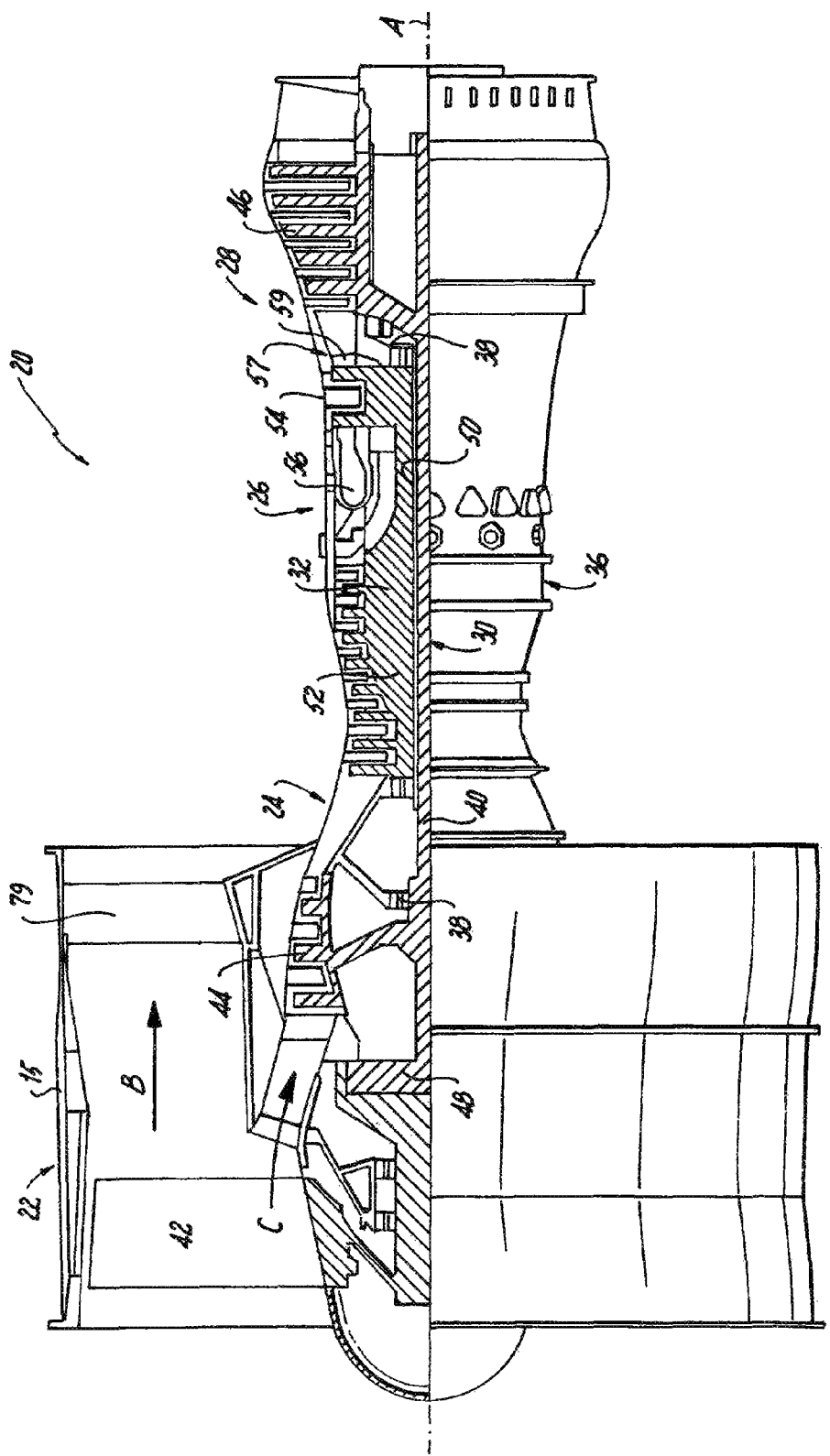
FIG. 1 is a schematic, partial cross-sectional view of a turbomachine in accordance with this disclosure.
Figure 2:
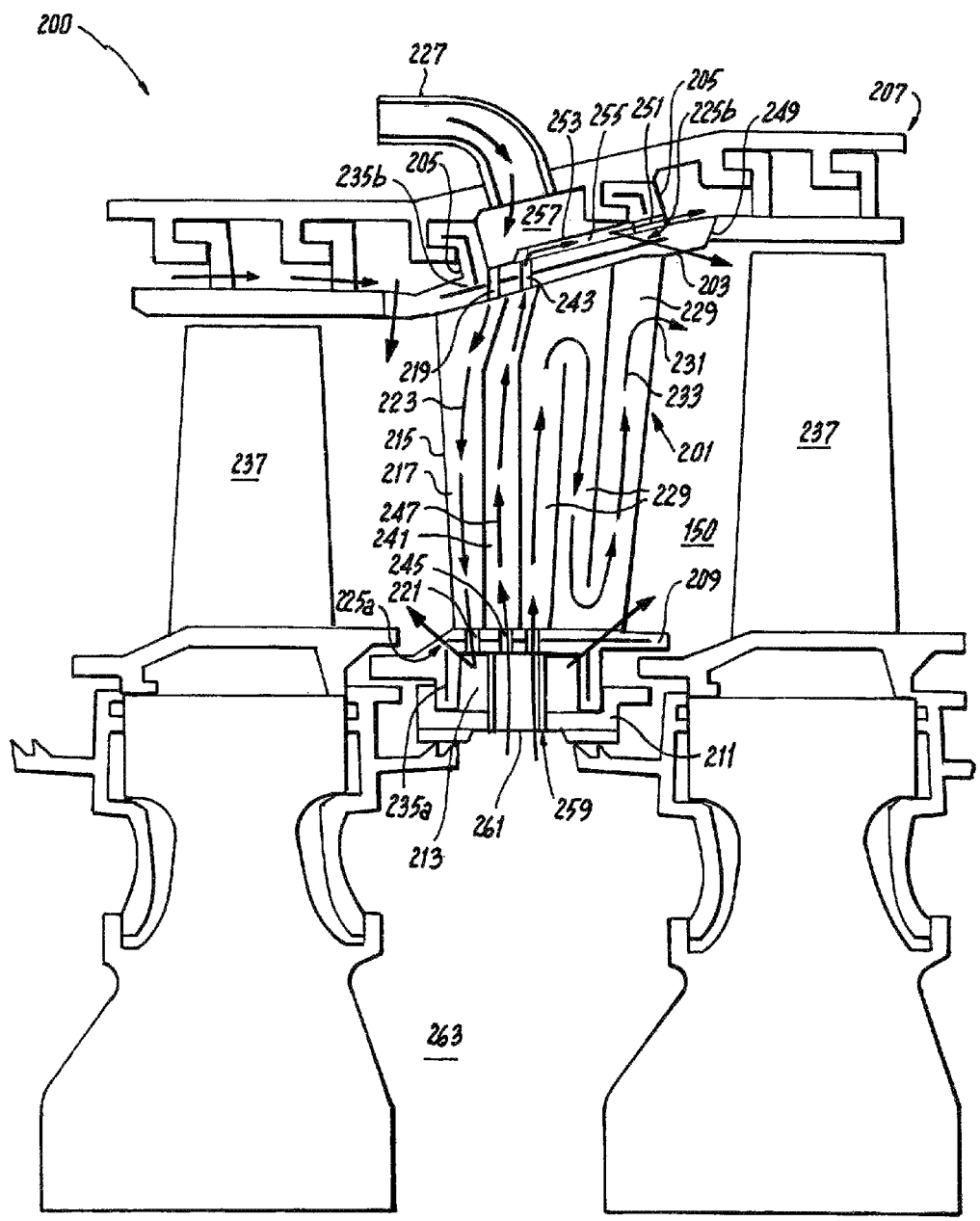
FIG. 2 is a schematic view of a system in accordance with this disclosure, showing a turbine cooling air (TCA) pipe in fluid communication with a vane.
Figure 3:
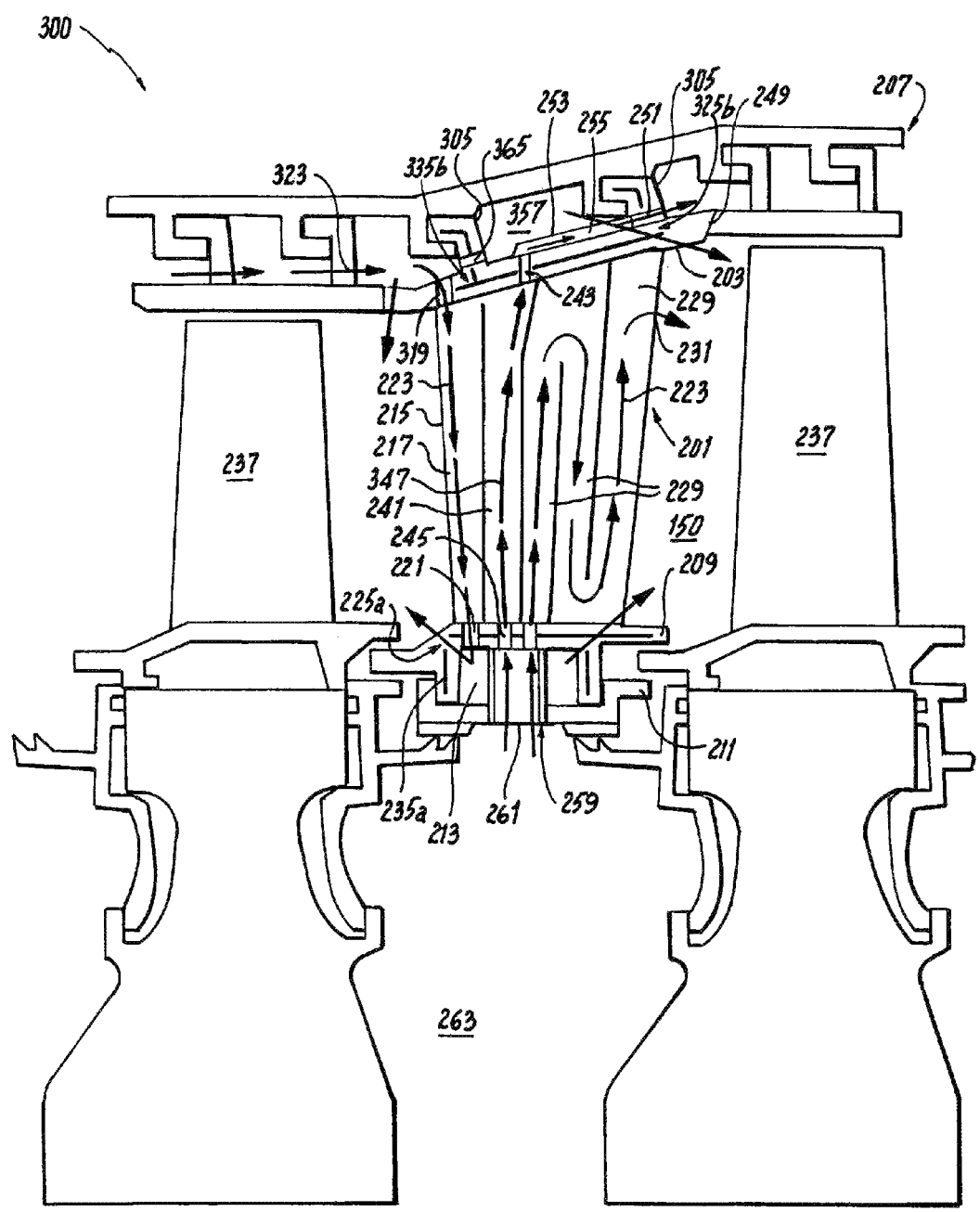
FIG. 3 is a schematic view of a system in accordance with this disclosure, shown without a TCA pipe in fluid communication with a vane.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 2 and is designated generally by reference character 200. Other embodiments and/or aspects of this disclosure are shown in FIGS. 1 and 3. The systems and methods described herein can be used to improve thermal efficiency of turbomachines.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Referring to FIG. 2, a cooling system 200 for a turbomachine includes a vane 201 having an outer diameter platform 203 including outer diameter attachment structure 205 operative to mount the vane 201 to an outer diameter stationary structure 207. The outer diameter attachment structure 205 can be solid (i.e., non-segmented) and span the width of the outer diameter platform 203. The outer diameter structure 205 can include any suitable shape (e.g., one or more hook, flanges).

The vane 201 includes an inner diameter platform 209 operative to be disposed on an inner diameter stationary structure 211. An inner diameter cavity 213 is defined by the inner diameter platform 209 and an inner diameter component, e.g., inner diameter stationary structure 211). It is contemplated that the inner diameter cavity 213 can be defined by the inner diameter platform 209 and any other suitable inner diameter component (e.g., an inner diameter cover plate).

An airfoil 215 is disposed between the outer diameter platform 203 and the inner diameter platform 209 and defines a first cross-passage 241, a first outer diameter opening 243, and a first inner diameter 245 opening such that a first leakage flow 247 can pass through the airfoil 215 from the inner diameter platform 209 to the outer diameter platform 203 and into an outer diameter leakage path 225b, 249 of the vane 201. As shown, the outer diameter leakage path 225b can be across an outer diameter seal, e.g., feather seal 235b, of the outer diameter platform 203 or between a pair of outer diameter feather seals 235b. The outer diameter feather seals 235b close circumferential gaps between adjacent outer diameter platforms 203 of adjacent vanes 201 but can include small gaps between portions of the feather seals 235b defining leakage path 225b. Other outer diameter leakage paths can include radial/axial gaps 249 between the outer diameter platform 203 and blade outer air seals 239.

The first outer diameter opening 243 can be disposed between attachment structure 205 and in fluid communication with any suitable outer diameter leakage path 225b, 249 in any suitable manner. For example, the first outer diameter opening can be in fluid communication with leakage path 249 defined at an aft edge of the outer diameter platform 203 via leakage metering outlets 251 disposed in the aft hook 205. As shown, a cover plate 253 can be disposed over the first outer diameter opening 243 to define a leakage transfer cavity 255 to guide the first leakage flow 247 to the metering outlets 251.

In certain embodiments, the cover plate 253 can be full-hoop, thereby separating leakage flow 223 from leakage path 225b and allowing the first outer diameter opening 243 to be in fluid communication with leakage path 225b via leakage transfer cavity 255. It is also contemplated that a separate cover plate for each vane could allow a portion of a second leakage flow 223, as described below, to be leaked through the leakage path 225b directly from outer diameter cavity 257.

The airfoil 215 can also include a second cross-passage 217. The second cross-passage 217 defines a second outer diameter opening 219 in the outer diameter platform 203 and a second inner diameter opening 221 in the inner diameter 209 platform such that a second leakage flow 223 can pass through the vane 201 from the outer diameter platform 203, through the airfoil 215, to the inner diameter platform 209, into the inner diameter cavity 213, and into an inner diameter leakage path 225a.

As shown, the inner diameter leakage path 225a can be across an inner diameter seal, e.g., feather seal 235a, of the inner diameter platform 209 or between a pair of inner diameter feather seals 235a. The inner feather seals 235a close circumferential gaps between adjacent inner diameter platforms 209 of adjacent vanes 201 but can include small gaps between portions of the feather seals 235a defining leakage path 225a.

As shown in FIG. 2, the system can include a turbine cooling air (TCA) pipe 227 in fluid communication with the second outer diameter opening 219. In such a configuration, the second outer diameter opening 219 can be disposed in between the outer diameter attachment structure 205. In certain embodiments, as that shown in FIG. 3, a second outer diameter opening 319 can be upstream of the outer diameter attachment structure 205 if no TCA pipe 227 is utilized.

The airfoil 215 can include one or more additional cooling passages 229 in fluid communication with one or more vane outlets 231 for allowing cooling flow 233 to exit from the airfoil 215 directly into a gas path 150. The cooling passages 229 can be any suitable cooling passage defined by the airfoil 215 (e.g., including a plurality of bends or other channels). The outlets 231 can include any suitable vane outlet (e.g., one or more holes or slots).

The inner diameter stationary structure 211 can include an inner air seal having an inner air seal cooling inlet 259. The system can further include a transfer tube 261 operatively coupled to the inner air seal cooling inlet 259 and the first inner diameter opening 245 such that the first inner diameter opening 245 is isolated from the second inner diameter opening 221. The transfer tube 261 can be made of aluminum sheet metal and/or any other suitable material. In this configuration, cooling air coming from the rotor cavity 263 will pass directly through the inner diameter cavity 213 and into the first cross-passage 241 and/or the additional cooling passages 229 thereby ensuring that the second leakage flow 223 will pass through the airfoil 215 before being leaked into the gas path 150.

Referring to FIG. 3, a system 300 is shown similar to system 200, however a TCA pipe is not included and the second outer diameter opening 319 is forward of the attachment structure 305. The forward hook 305 also includes leakage metering inlets 365 for allowing a portion of a second leakage flow 323 to pass therethrough into the outer diameter cavity 357 and to be leaked into the gas path through leakage path 325b. It is contemplated that leakage metering inlets 365 need not be included and/or at least a portion of the first leakage flow 347 can be used to leak through leakage path 325b.

Using systems as described above, leakage flow is utilized for enhanced cooling by virtue of routing leakage flow through a vane to absorb heat therefrom before being leaked into the gas path. To this end, the first cross-passage and/or the second cross-passage and/or any additional cross-passages can be dimensioned and/or positioned to increase a temperature of leakage flow up to, but not including, a material failure temperature of any suitable non-gas path component (e.g., stationary structures 207, 211 associated with the vane 201). In certain configurations, leakage air can be heated up at least about 200 degrees F. (about 110 degrees C.) and still be below material temperature limits for non-gas path components. This prevents melting of non-gas path components and increases the thermal efficiency overall such that less dedicated cooling flow (e.g., from rotor cavity) is required for sufficient vane cooling.

In at least one aspect of this disclosure, a method for cooling a component of a turbomachine (e.g., vane 201) includes passing a first leakage flow 247 from an inner diameter to an outer diameter of a vane 201, or from an inner diameter to an outer diameter of the vane 201, through an airfoil 215 of the vane 201, and leaking the first leakage flow through a leakage path (e.g., one or more of leakage paths 225b, 249) into a gas path 150 after passing the first leakage flow 247 through the airfoil 215 of the vane 201.

The method can further include allowing the leakage flow to heat up to, but not including, a material failure temperature of a non-gas path component associated with vane 201. The method can further include passing a second leakage flow 223 through the airfoil 215 portion of the vane 201 in the opposite direction of the second leakage flow 247 and leaking the flow into the gas path 150. The method can further include isolating the second leakage flow 223 from the second leakage flow 247.

A method for cooling a component of a turbomachine can include passing a first leakage flow 247 from an inner diameter to an outer diameter of a vane 201 through an airfoil of the vane, passing a second leakage flow from an outer diameter to an inner diameter of a vane through an airfoil of the vane, leaking the first leakage flow through an outer diameter leakage path into a gas path after passing the first leakage flow through the airfoil of the vane, and leaking the second leakage flow through an inner diameter leakage path into the gas path after passing the second leakage flow through the airfoil of the vane. The method can further include allowing the first leakage flow and/or second leakage flow to heat up to, but not including, a material failure temperature of a component associated with the vane.

The methods and systems of the present disclosure, as described above and shown in the drawings, provide for leakage air systems with superior properties including enhanced efficiency and cooling for turbomachine components. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A cooling system for a turbomachine, comprising:
  a vane, including:
    an outer diameter platform at one end including outer diameter attachment structure operative to mount the vane to an outer diameter stationary structure, the outer diameter attachment structure having leakage metering outlets formed therein;
    an outer diameter cavity defined by the outer diameter platform and an outer diameter component;
    an inner diameter platform at another end of the vane opposite the outer diameter platform and operative to be disposed against an inner diameter component;
    an inner diameter cavity defined by the inner diameter platform and the inner diameter component; and
    an airfoil disposed between the outer diameter platform and the inner diameter platform and defining a first cross-passage, wherein the first cross-passage defines a first outer diameter opening in the outer diameter platform, wherein the first cross-passage defines a first inner diameter opening in the inner diameter platform such that a first leakage flow can pass through the vane from the inner diameter platform, through the airfoil, to the outer diameter platform, and into an outer diameter leakage path of the vane, wherein the outer diameter leakage path is defined through the leakage metering outlets of the outer diameter attachment structure; and
    a second cross-passage within the airfoil arranged such that a second leakage flow can pass through the vane from the outer diameter platform, through the airfoil, and to the inner diameter platform, wherein the first leakage flow and the second leakage flow are fluidly separated when passing through the vane,
    wherein the second cross-passage extends between a second outer diameter opening and a second inner diameter opening such that the second leakage flow passes through the vane from the outer diameter platform to the inner diameter cavity and into an inner diameter leakage path of the vane.

2. The system of claim 1, wherein the outer diameter component is a cover plate that is disposed on the outer diameter platform, the cover plate defining a leakage transfer cavity to guide the first leakage flow to the leakage metering outlets.

3. The system of claim 1, wherein the inner diameter component is a cover plate that is disposed on the inner diameter platform.

4. The system of claim 1, wherein the inner diameter component is an inner diameter stationary structure that is disposed on the inner diameter platform.

5. The system of claim 1, wherein the airfoil includes additional cooling passages in fluid communication with vane outlets for allowing flow to exit from the airfoil directly into a gas path.

6. The system of claim 1, wherein the outer diameter leakage path is between a pair of outer diameter feather seals of the outer diameter platform.

7. The system of claim 1, wherein the outer diameter opening is disposed between attachment structure and in fluid communication with the outer diameter leakage path.

8. The system of claim 1, wherein the second outer diameter opening is upstream of the outer diameter attachment structure relative to a gas path.

9. The system of claim 1, wherein the second outer diameter opening is axially in between the outer diameter attachment structure.

10. The system of claim 1, further comprising a turbine cooling air (TCA) pipe in fluid communication with the second outer diameter opening.

11. The system of claim 1, wherein the inner diameter component is an inner diameter stationary structure that includes an inner air seal having an inner air seal cooling inlet.

12. The system of claim 11, further including a transfer tube operatively coupled to the inner air seal cooling inlet and the first inner diameter opening, such that the second inner diameter opening is isolated from the first inner diameter opening.

13. The system of claim 1, wherein the first cross-passage and the second cross-passage can be dimensioned and/or positioned to increase a temperature of leakage flow up to, but not including, a material failure temperature of a component associated with the vane.

14. A method for cooling a component of a turbomachine, comprising:
  passing a first leakage flow from an inner diameter to an outer diameter of a vane through a first cross-passage;
  leaking the first leakage flow through an outer diameter leakage path into a gas path after passing the first leakage flow through an airfoil of the vane, the outer diameter leakage path passing through leakage metering outlets formed in an outer diameter attachment structure operative to mount the vane to an outer diameter stationary structure;
  passing a second leakage flow from the outer diameter to the inner diameter of the vane through a second cross-passage, wherein the first leakage flow and the second leakage flow are fluidly separated when passing through the vane,
  passing the second leakage flow through the airfoil of the vane in the opposite direction of the first leakage flow and leaking the flow, and
  isolating the first leakage flow from the second leakage flow.

15. The method of claim 14, further comprising allowing the first leakage flow to heat up to, but not including, a material failure temperature of a component associated with the vane.

16. The method claim 14, further comprising:
and leaking the second leakage flow through an inner diameter leakage path into the gas path after passing the second leakage flow through the airfoil of the vane.

17. The method of claim 16, further comprising allowing the first leakage flow and/or second leakage flow to heat up to, but not including, a material failure temperature of a component associated with the vane.

18. A cooling system for a turbomachine, comprising:
a vane, including:
an outer diameter platform at one end including outer diameter attachment structure operative to mount the vane to an outer diameter stationary structure, the outer diameter attachment structure having leakage metering outlets formed therein;
an outer diameter cavity defined by the outer diameter platform and an outer diameter component;
an inner diameter platform at another end of the vane opposite the outer diameter platform and operative to be disposed against an inner diameter component;
an inner diameter cavity defined by the inner diameter platform and the inner diameter component; and
an airfoil disposed between the outer diameter platform and the inner diameter platform and defining a first cross-passage, wherein the first cross-passage defines a first outer diameter opening in the outer diameter platform, wherein the first cross-passage defines a first inner diameter opening in the inner diameter platform such that a first leakage flow can pass through the vane from the inner diameter platform, through the airfoil, to the outer diameter platform, and into an outer diameter leakage path of the vane, wherein the outer diameter leakage path is defined through the leakage metering outlets of the outer diameter attachment structure; and
a second cross-passage within the airfoil arranged such that a second leakage flow can pass through the vane from the outer diameter platform, through the airfoil, and to the inner diameter platform, wherein the first leakage flow and the second leakage flow are fluidly separated when passing through the vane,
wherein the inner diameter component is an inner diameter stationary structure that is disposed on the inner diameter platform.

* * * * *